(12) United States Patent
Matsumoto et al.

(10) Patent No.: US 6,374,967 B2
(45) Date of Patent: Apr. 23, 2002

(54) DAMPING FORCE CONTROL TYPE HYDRAULIC SHOCK ABSORBER

(75) Inventors: Takuya Matsumoto, Chiba-ken; Takashi Nezu, Tokyo, both of (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/725,759

(22) Filed: Nov. 30, 2000

(51) Int. Cl.$^7$ .................................................. F16F 9/34
(52) U.S. Cl. ................ 188/280; 188/266.5; 188/282.4; 188/282.2; 188/322.15
(58) Field of Search ............................. 188/280, 266.1, 188/266.2, 266.5, 282.1, 282.2, 282.3, 282.4, 282.5, 282.6, 317, 320, 322.13, 266.3, 266.4, 266.6, 322.15, 322.22; 280/5.515, 5.519

(56) References Cited

U.S. PATENT DOCUMENTS 5,503,258 A * 4/1996 Clarke et al. ............ 188/266.5

FOREIGN PATENT DOCUMENTS

JP 464740 * 2/1992

* cited by examiner

*Primary Examiner*—Douglas C. Butler
(74) *Attorney, Agent, or Firm*—Wenderoth, Lind & Ponack, L.L.P.

(57) ABSTRACT

A damping force control type hydraulic shock absorber capable of generating stable damping force even if the flow rate of hydraulic fluid changes sharply. Hydraulic fluid chambers at the respective ends of valve members are cut off from the downstream ports of extension and compression pressure control valves by flange portions of the valve members. When the flow rate of hydraulic fluid increases sharply, even if the pressure in the downstream ports changes sharply owing to the flow resistance in check valves on the downstream side of the downstream ports, the pressure is not transmitted to the hydraulic fluid chambers. Therefore, there is no possibility of the slider moving under the influence of such a pressure change.

10 Claims, 3 Drawing Sheets

DAMPING FORCE CONTROL TYPE HYDRAULIC SHOCK ABSORBER

BACKGROUND OF THE INVENTION

The present invention relates to damping force control type hydraulic shock absorbers attached to suspension systems of automobiles or other vehicles. More particularly, the present invention relates to a damping force control type hydraulic shock absorber capable of appropriately controlling damping force in accordance with the road surface conditions, vehicle running conditions, etc. with a view to improving the ride quality and the steering stability.

In general, a damping force control type hydraulic shock absorber includes a cylinder having a hydraulic fluid sealed therein. A piston connected with a piston rod is slidably fitted in the cylinder. The hydraulic fluid is caused to flow through a hydraulic fluid passage by sliding movement of the piston in the cylinder. The flow of hydraulic fluid is controlled by a damping force generating mechanism formed from orifices and disk valves to generate damping force, and the damping force is controlled by changing the flow path area with a damping force control valve.

The assignee disclosed a damping force control type hydraulic shock absorber in the specification of Japanese Patent Application No. Hei 11-121787. The disclosed damping force control type hydraulic shock absorber has a variable pressure control valve in which a slider valve is slidably fitted in a cylindrical sleeve, and the flow of hydraulic fluid through ports provided in the side wall of the sleeve is controlled in accordance with the position of the slider valve, thereby controlling damping force.

More specifically, an enlarged-diameter portion is formed in the inner wall of the sleeve. A disk valve body supported by the slider valve is seated on a shoulder provided by the enlarged-diameter portion. The plunger of a solenoid pushes the slider valve in the direction for closing the variable pressure control valve, that is, in a direction in which the disk valve body is pressed against the shoulder. The pressure of hydraulic fluid for opening the variable pressure control valve is determined from the relationship between the magnitude of pressing force of the plunger and the pressure of hydraulic fluid applied to the disk valve body.

However, the damping force control type hydraulic shock absorber disclosed in the above-described specification suffers from the following problem. Because each end of the slider valve is disposed in a hydraulic fluid chamber communicating with a hydraulic fluid passage on the downstream side of the variable pressure control valve, the change in the pressure in the hydraulic fluid chambers influences the slider valve. When the flow rate of hydraulic fluid flowing through the variable pressure control valve increases sharply, the pressure in the downstream-side hydraulic fluid chamber rises sharply. This causes imbalance between the pressures in the hydraulic fluid chambers at the two ends of the slider valve. As a result, the slider valve moves undesirably. Accordingly, there is likelihood of damping force becoming unstable.

SUMMARY OF THE INVENTION

The present invention was made in view of the above-described circumstances. An object of the present invention is to provide a damping force control type hydraulic shock absorber capable of generating stable damping force even if the flow rate of hydraulic fluid changes sharply.

To attain the above-described object, the present invention provides a damping force control type hydraulic shock absorber including a cylinder having a hydraulic fluid sealed therein. A piston is slidably fitted in the cylinder. A piston rod is connected at one end thereof to the piston. The other end of the piston rod extends to the outside of the cylinder. A hydraulic fluid passage passes the hydraulic fluid in response to sliding movement of the piston. A damping force control valve controls damping force by controlling the flow of hydraulic fluid through the hydraulic fluid passage.

The damping force control valve is a variable pressure control valve having a slider valve slidably fitted in an approximately cylindrical sleeve to control the pressure of hydraulic fluid between upstream and downstream ports provided in the side wall of the sleeve by movement of the slider valve. A hydraulic fluid chamber on the downstream end portion of the slider valve in the sleeve is cut off from the downstream port.

With the above-described arrangement, the pressure of hydraulic fluid between the ports in the sleeve does not act on the hydraulic fluid chamber on the downstream end of the slider valve. Therefore, there is no possibility of the slider valve being moved by the pressure of hydraulic fluid between the ports in the sleeve.

In the damping force control type hydraulic shock absorber according to the present invention having the above-described arrangement, the damping force control valve may be a pilot valve of a pilot operated type damping valve that generates damping force in accordance with sliding movement of the piston.

With the above-described arrangement, the pilot pressure changes as a result of the control of the damping force control valve, causing valve-opening characteristics of the pilot operated type damping valve to change.

The above and other objects, features and advantages of the present invention will become more apparent from the following description of the preferred embodiments thereof, taken in conjunction with the accompanying drawings.

DETAILED DESCRIPTION OF THE INVENTION

Embodiments of the present invention will be described below in detail with reference to the accompanying drawings.

Figure 1:
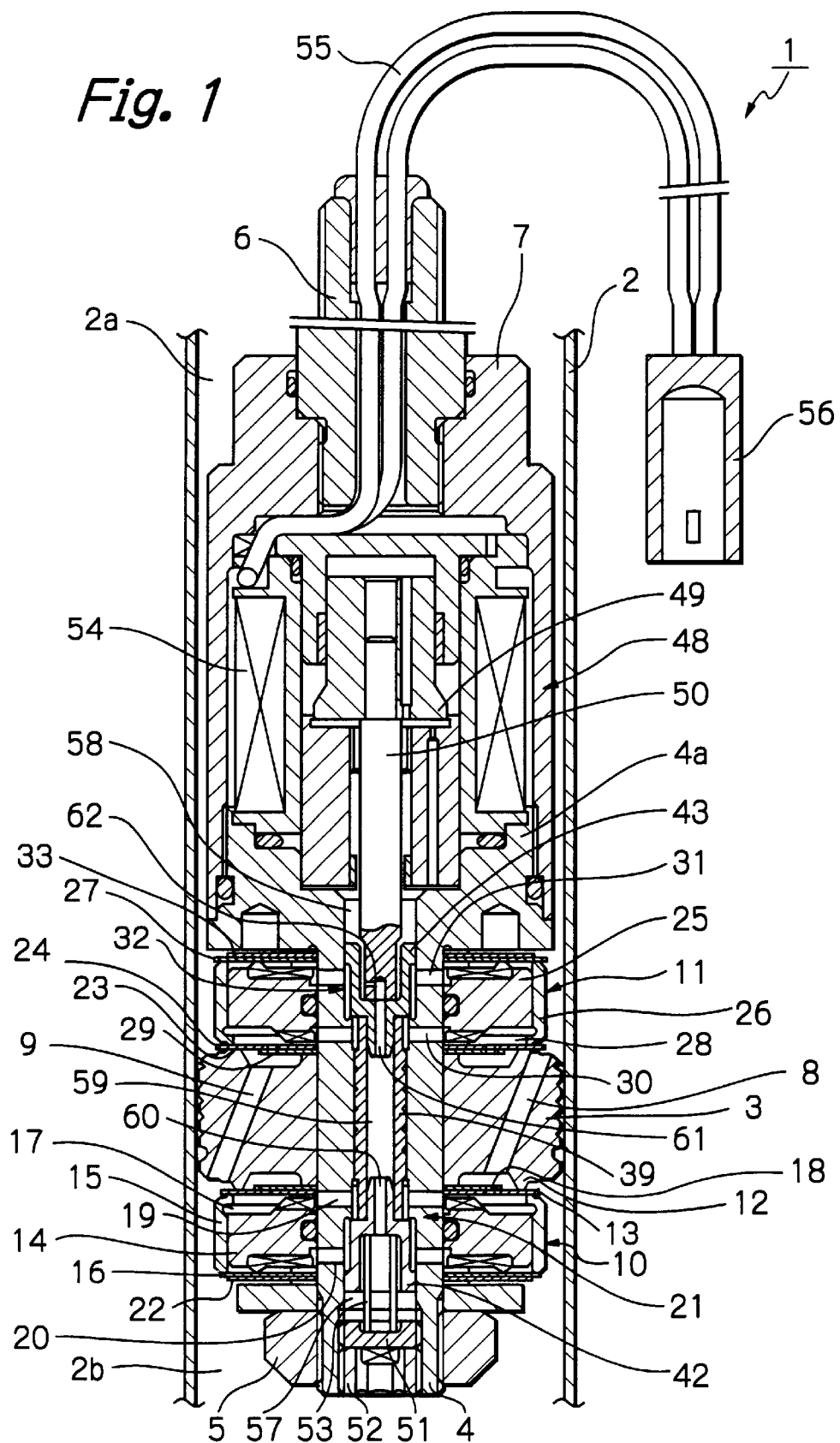
FIG. 1 is a vertical sectional view of an essential part of a damping force control type hydraulic shock absorber according to a first embodiment of the present invention.
Figure 2:
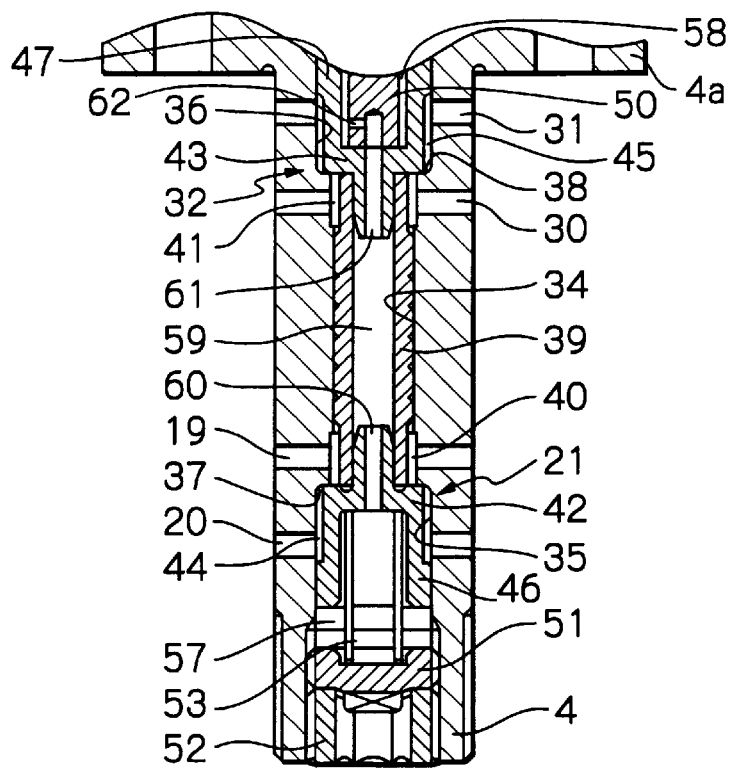
FIG. 2 is an enlarged view showing a piston bolt and associated members constituting a damping force control valve of the damping force control type hydraulic shock absorber shown in FIG. 1.

A first embodiment will be described with reference to FIGS. 1 and 2. As shown in FIG. 1, a damping force control type hydraulic shock absorber 1 according to the first embodiment includes a cylinder 2 having a hydraulic fluid sealed therein. A piston 3 is slidably fitted in the cylinder 2. The piston 3 divides the inside of the cylinder 2 into two chambers, i.e. a cylinder upper chamber 2a and a cylinder lower chamber 2b. An approximately cylindrical piston bolt 4 (sleeve) is inserted into the piston 3 and secured by using a nut 5. The piston bolt 4 has a large-diameter portion 4a at the proximal end thereof. A solenoid casing 7 connected to one end portion of a hollow piston rod 6 is screwed onto the large-diameter portion 4a of the piston bolt 4. The other end portion of the piston rod 6 extends through the cylinder upper chamber 2a and further through a rod guide (not shown) and an oil seal (not shown), which are fitted to the upper end portion of the cylinder 2, and projects to the outside of the cylinder 2. It should be noted that the cylinder 2 is provided with a reservoir or a gas chamber to compensate for a volumetric change in the cylinder 2 due to extension and contraction of the piston rod 6.

The piston 3 is provided with an extension hydraulic fluid passage 8 and a compression hydraulic fluid passage 9 for communication between the cylinder upper and lower chambers 2a and 2b. An extension damping force generating mechanism 10 is provided between the piston 3 and the nut 5 to control the flow of hydraulic fluid in the extension hydraulic fluid passage 8. A compression damping force generating mechanism 11 is provided between the piston 3 and the large-diameter portion 4a of the piston bolt 4 to control the flow of hydraulic fluid in the compression hydraulic fluid passage 9.

The extension damping force generating mechanism 10 will be described below. An annular valve seat 12 projects from an end surface of the piston 3 that faces the cylinder lower chamber 2b. A disk valve 13 (a pilot operated type damping valve) is seated on the valve seat 12. An annular fixing member 14 is mounted on the piston bolt 4 between the piston 3 and the nut 5. A movable ring 15 is slidably fitted on the outer periphery of the fixing member 14. The movable ring 15 is pressed to abut on the disk valve 13 by spring force of a disk-shaped plate spring 16 clamped between the fixing member 14 and the nut 5. A pilot chamber 17 is formed between the disk valve 13 and the fixing member 14 so that the pressure in the pilot chamber 17 acts on the disk valve 13 in the direction for closing it. The pilot chamber 17 is communicated with the extension hydraulic fluid passage 8 through a fixed orifice 18 provided in the disk valve 13. The pilot chamber 17 is also communicated with the other side of the fixing member 14 by ports 19 and 20 provided in the side wall of the piston bolt 4 through an extension pressure control valve 21 (a damping force control valve, or a variable pressure control valve) provided inside the piston bolt 4. The pilot chamber 17 is further communicated with the cylinder lower chamber 2b through a check valve 22 formed from a disk valve superimposed on the plate spring 16.

The compression damping force generating mechanism 11 will be described below. An annular valve seat 23 projects from an end surface of the piston 3 that faces the cylinder upper chamber 2a. A disk valve 24 (a pilot operated type damping valve) is seated on the valve seat 23. An annular fixing member 25 is mounted on the piston bolt 4 between the large-diameter portion 4a and the piston 3. A movable ring 26 is slidably fitted on the outer periphery of the fixing member 25. The movable ring 26 is pressed to abut on the disk valve 24 by spring force of a disk-shaped plate spring 27 clamped between the fixing member 25 and the large-diameter portion 4a. A pilot chamber 28 is formed between the disk valve 24 and the fixing member 25 so that the pressure in the pilot chamber 28 acts on the disk valve 24 in the direction for closing it. The pilot chamber 28 is communicated with the compression hydraulic fluid passage 9 through a fixed orifice 29 provided in the disk valve 24. The pilot chamber 28 is also communicated with the other side of the fixing member 25 by ports 30 and 31 provided in the side wall of the piston bolt 4 through a compression pressure control valve 32 (a damping force control valve, or a variable pressure control valve) provided inside the piston bolt 4. The pilot chamber 28 is further communicated with the cylinder upper chamber 2a through a check valve 33 formed from a disk valve superimposed on the plate spring 27.

The extension and compression pressure control valves 21 and 32 will be described below with reference mainly to FIG. 2. The piston bolt 4 has a small-diameter bore 34 in the center thereof. The ports 19 and 30 open into the small-diameter bore 34. Large-diameter bores 35 and 36 are formed at both ends of the small-diameter bore 34. The ports 20 and 31 open into the large-diameter bores 35 and 36, respectively. Annular valve seats 37 and 38 are formed by step portions between the small-diameter bore 34 and the large-diameter bores 35 and 36. A cylindrical slider 39 is slidably fitted in the small-diameter bore 34 of the piston bolt 4. Annular valve chambers 40 and 41 are formed between the small-diameter bore 34 and small-diameter portions formed at both ends of the slider 39. The valve chambers 40 and 41 communicate with the ports 19 and 30, respectively. Valve members 42 and 43 are secured to both ends of the slider 39. The valve members 42 and 43 are adapted to rest on or separate from the valve seats 37 and 38, respectively. The valve members 42 and 43 are each in the shape of a cylindrical member, one end of which is almost closed. Each of the valve members 42 and 43 has a projecting portion at the bottom thereof. The projecting portion is press-fitted into the slider 39. Annular valve chambers 44 and 45 are formed between the valve members 42 and 43 and the large-diameter bores 35 and 36, respectively. The valve chambers 44 and 45 communicate with the ports 20 and 31, respectively. The valve members 42 and 43 have flange portions 46 and 47 extending from the outer peripheries of the open ends thereof. The flange portions 46 and 47 are slidably fitted in the large-diameter bores 35 and 36, respectively. The slider 39 and the valve members 42 and 43 constitute a slider valve according to the present invention.

A proportional solenoid 48 is provided in the solenoid casing 7. An actuating rod 50 is connected to a plunger 49 of the proportional solenoid 48. The distal end portion of the actuating rod 50 is inserted into the valve member 43 secured to one end of the slider 39. The distal end of the actuating rod 50 abuts on the bottom of the valve member 43. An adjusting screw 51 and a lock nut 52 are screwed into the large-diameter bore 35 at the distal end of the piston bolt 4 to close the opening of the large-diameter bore 35. A return spring 53 (compression spring) is interposed between the valve member 42 secured to the other end of the slider 39 and the adjusting screw 51. Lead wires 55 of a coil 54 of the proportional solenoid 48 extend through the hollow piston rod 6 to the outside of the cylinder 2. Thus, electric power can be supplied to the coil 54 from a connector 56 connected to the distal ends of the lead wires 55.

A hydraulic fluid chamber 57 is formed between the valve member 42 and the adjusting screw 51 in the large-diameter bore 35. The hydraulic fluid chamber 57 is cut off from the valve chamber 44 by the flange portion 46. A hydraulic fluid chamber 58 is formed at the rear side of the valve member 43 in the large-diameter bore 36 to communicate with the inside of the proportional solenoid 48. The hydraulic fluid chamber 58 is cut off from the valve chamber 45 by the flange portion 47. The hydraulic fluid chambers 57 and 58 are communicated with each other through a hydraulic fluid passage 59 in the slider 39 and through hydraulic fluid passages 60 and 61 formed in the respective projecting portions of the valve members 42 and 43 and further through an orifice passage 62 provided in the distal end portion of the actuating rod 50 of the proportional solenoid 48. It should be noted that the fit between the large-diameter bores 35 and 36 and the flange portions 46 and 47 of the valve members 42 and 43 allows a slight leakage of hydraulic fluid as caused by a volume change due to a change in temperature or the like of the hydraulic fluid in the hydraulic fluid chambers 57 and 58.

The following is a description of the operation of this embodiment arranged as stated above.

During the extension stroke of the piston rod 6, as the piston 3 moves, the hydraulic fluid in the cylinder upper chamber 2a is pressurized. Consequently, before the disk valve 13 of the extension damping force generating mechanism 10 opens (in a low piston speed region), the hydraulic fluid in the cylinder upper chamber 2a flows to the cylinder lower chamber 2b through the extension hydraulic fluid passage 8, the fixed orifice 18 in the disk valve 13, the pilot chamber 17, the port 19, the extension pressure control valve 21, the port 20 and the check valve 22. When the pressure in the cylinder upper chamber 2a reaches the valve opening pressure of the disk valve 13 (a high piston speed region), the disk valve 13 opens to allow the hydraulic fluid from the extension hydraulic fluid passage 8 to flow directly into the cylinder lower chamber 2b.

Thus, before the disk valve 13 opens (in the low piston speed region), damping force is generated by the fixed orifice 18 and the extension pressure control valve 21. The degree of opening of the extension pressure control valve 21 is determined by the balance between force exerted on the valve member 42 by the pressure of hydraulic fluid in the valve chamber 40 and thrust derived from the return spring 53 and the proportional solenoid 48. Therefore, damping force before the disk valve 13 opens (in the low piston speed region) can be controlled directly by controlling the electric current supplied to the coil 54 independently of the piston speed.

At this time, according to the degree of opening of the valve member 42, the pressure in the pilot chamber 17, which is on the upstream side of the valve member 42, changes, and the pressure in the pilot chamber 17 acts on the disk valve 13 in the direction for closing it as a pilot pressure. Therefore, it is possible to control the valve opening pressure of the disk valve 13 together with the valve opening pressure of the valve member 42. Thus, damping force in the high piston speed region can be controlled simultaneously.

During the compression stroke of the piston rod 6, as the piston 3 moves, the hydraulic fluid in the cylinder lower chamber 2b is pressurized. Consequently, before the disk valve 24 of the compression damping force generating mechanism 11 opens (in the low piston speed region), the hydraulic fluid in the cylinder lower chamber 2b flows to the cylinder upper chamber 2a through the compression hydraulic fluid passage 9, the fixed orifice 29 in the disk valve 24, the pilot chamber 28, the port 30, the compression pressure control valve 32, the port 31 and the check valve 33. When the pressure in the cylinder lower chamber 2b reaches the valve opening pressure of the disk valve 24 (the high piston speed region), the disk valve 24 opens to allow the hydraulic fluid from the compression hydraulic fluid passage 9 to flow directly into the cylinder upper chamber 2a.

Thus, before the disk valve 24 opens (in the low piston speed region), damping force is generated by the fixed orifice 29 and the compression pressure control valve 32. The degree of opening of the compression pressure control valve 32 is determined by the balance between force exerted on the valve member 43 by the pressure of hydraulic fluid in the valve chamber 41 and thrust derived from the return spring 53 and the proportional solenoid 48. Therefore, damping force before the disk valve 24 opens (in the low piston speed region) can be controlled directly by controlling the electric current supplied to the coil 54 independently of the piston speed.

At this time, according to the degree of opening of the valve member 43, the pressure in the pilot chamber 28, which is on the upstream side of the valve member 43, changes, and the pressure in the pilot chamber 28 acts on the disk valve 24 in the direction for closing it as a pilot pressure. Therefore, it is possible to control the valve opening pressure of the disk valve 24 together with the valve opening pressure of the valve member 43. Thus, damping force in the high piston speed region can be controlled simultaneously.

When the slider 39 is placed in an intermediate position where both the valve members 42 and 43 are separate from the valve seats 37 and 38 by controlling the electric current supplied to the coil 54 of the proportional solenoid 48, "soft" damping force characteristics (small damping force) can be obtained during both the extension and compression strokes of the piston rod 6. By urging the valve member 42 to press on the valve seat 37 and thus separating the valve member 43 from the valve seat 38, it is possible to obtain "hard" damping force characteristics (large damping force) during the extension stroke and "soft" damping force characteristics during the compression stroke. By urging the valve member 43 to press on the valve seat 38 and thus separating the valve member 42 from the valve seat 37, it is possible to obtain "soft" damping force characteristics during the extension stroke and "hard" damping force characteristics during the compression stroke. Thus, it is possible to obtain extension/compression inverting damping force characteristics suitable for semi-active suspension control based on the skyhook damper theory.

As has been stated above, the flange portions 46 and 47 of the valve members 42 and 43 are fitted in the large-diameter bores 35 and 36, respectively, whereby the hydraulic fluid chambers 57 and 58 at the respective ends of the valve members 42 and 43 secured to the slider 39 are cut off from the valve chambers 44 and 45 communicating with the downstream ports 20 and 31 of the extension and compression pressure control valves 21 and 32. Accordingly, even if the flow rate of hydraulic fluid increases sharply and consequently the pressure in the valve chambers 44 and 45 increases temporarily owing to the influence of flow resistance in the check valves 22 and 33, the pressure is not transmitted to the hydraulic fluid chambers 57 and 58. Therefore, there is no possibility of the slider 39 moving under the influence of such a pressure change. Accordingly, stable damping force can be obtained.

Next, a second embodiment of the present invention will be described with reference to FIG. 3. It should be noted that the second embodiment is similar in structure to the first embodiment except for the structure of fit between the valve members 42 and 43 and the large-diameter bores 35 and 36. Therefore, members or portions similar to those in the first embodiment shown in FIG. 2 are denoted by the same reference numerals, and only a part of the second embodiment in which it differs from the first embodiment will be described below in detail.

Figure 3:
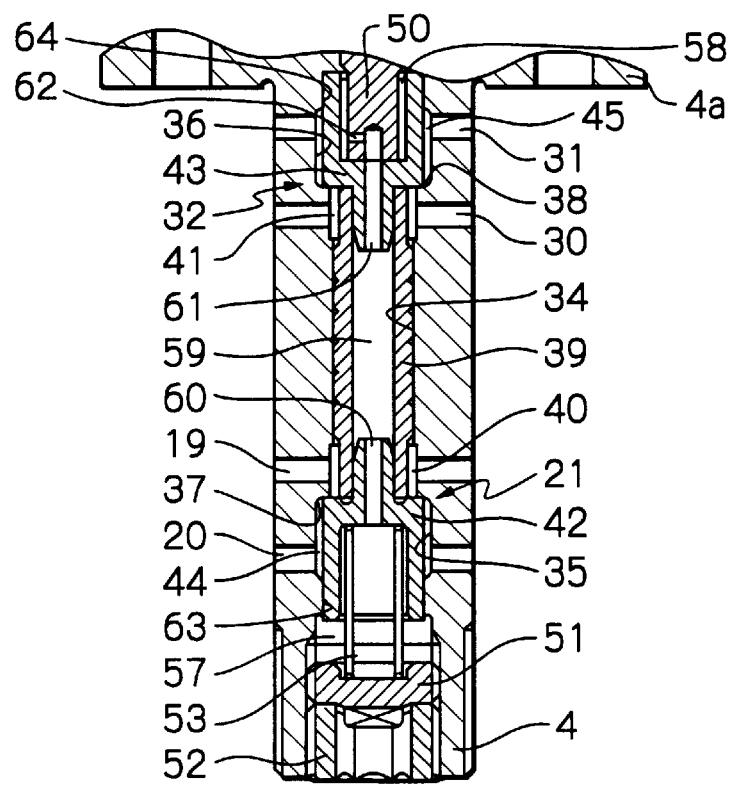
FIG. 3 is an enlarged view showing a piston bolt and associated members constituting a damping force control valve of a damping force control type hydraulic shock absorber according to a second embodiment of the present invention.

As shown in FIG. 3, in the second embodiment, the flange portions 46 and 47 of the valve members 42 and 43 are omitted, but instead the large-diameter bores 35 and 36 are provided with small-diameter portions 63 and 64, respectively. The small-diameter portions 63 and 64 are fitted on the respective outer peripheries of the valve members 42 and 43, whereby valve chambers 44 and 45 communicating with the ports 20 and 31, respectively, are formed downstream the extension and compression pressure control valves 21 and 32. With this arrangement, the hydraulic fluid chambers 57 and 58 are cut off from the valve chambers 44 and 45 by the small-diameter portions 63 and 64. Thus, there is no possibility that a change in pressure of hydraulic fluid in the valve chambers 44 and 45 will act in the axial direction of the valve members 42 and 43. Accordingly, it is possible to surely prevent undesired movement of the slider 39 due to a pressure change and hence possible to obtain stable damping force.

Next, a modification of the second embodiment will be described with reference to FIG. 4. In this modification, the slider 39 and the valve members 42 and 43 as shown in FIG. 3 are integrated into a slider valve structure, which is halved at an approximately central portion in the axial direction to provide an upper (compression side) slider valve 70 and a lower (extension side) slider valve 71.

With the above-described arrangement, the combination of the slider valves 70 and 71 has an approximately similar profile to that of the combination of the slider 39 and the valve members 42 and 43 in FIG. 3 and thus provides the same advantageous effect as that in the second embodiment. In addition, it becomes unnecessary to perform an operation of press-fitting valve members into a slider as required in the embodiment shown in FIG. 3. Therefore, there is no likelihood of misalignment, which might otherwise occur during the press-fitting operation, and the alignment accuracy can be increased. Consequently, the leakage of hydraulic fluid is minimized, and the design damping force can be obtained easily. Furthermore, cost reduction can be attained by eliminating the press-fitting process. Moreover, because there are no shavings which would otherwise occur during the press-fitting process, it is possible to prevent occurrence of a failure in operation due to foreign matter.

Figure 4:
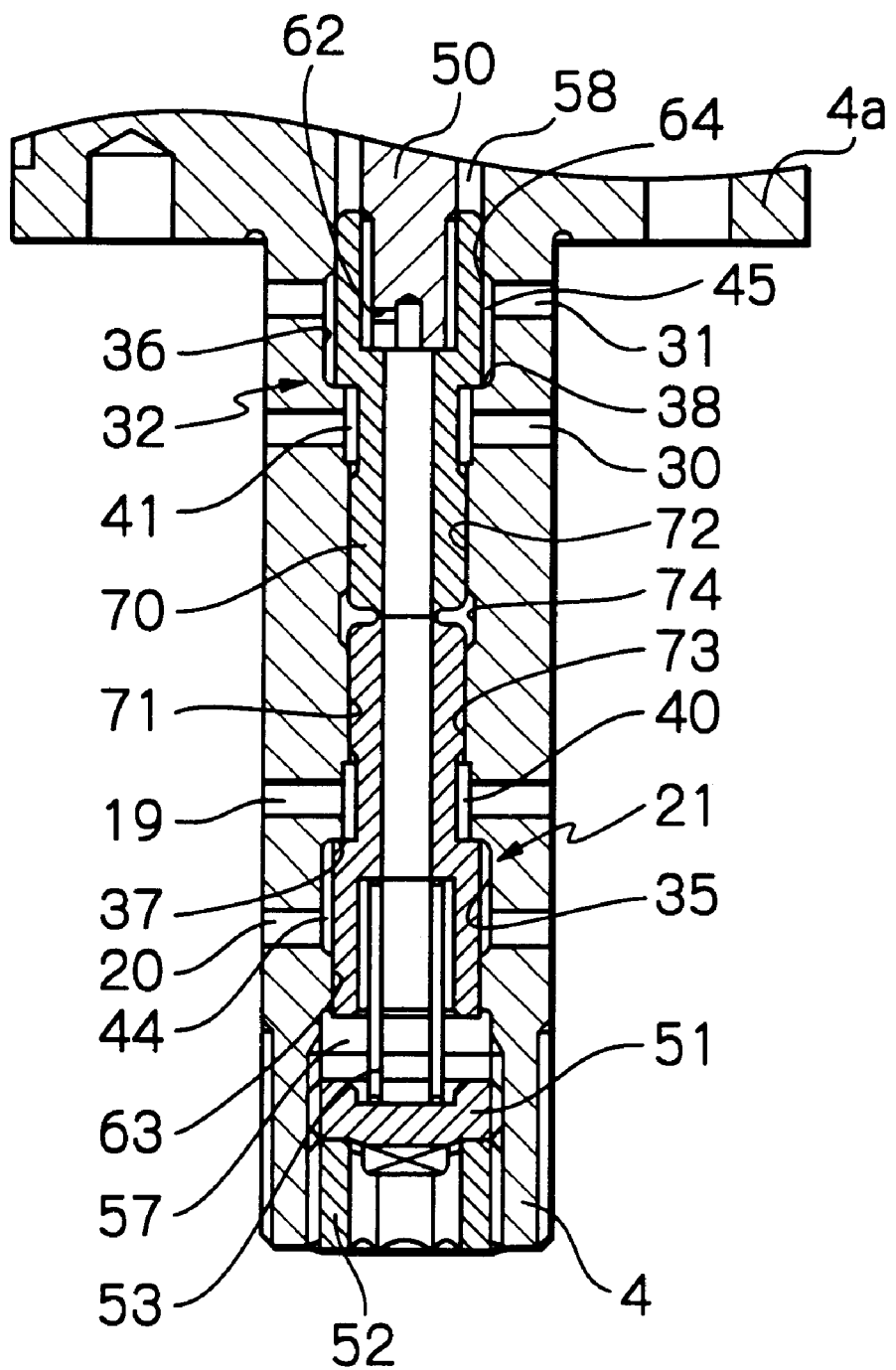
FIG. 4 is an enlarged view showing a piston bolt and associated members in a modification of the second embodiment shown in FIG. 3.

In order to increase the alignment accuracy in FIG. 4, it is necessary to drill a hole (slider receiving portion) in the piston bolt 4 with high accuracy. Accordingly, drilling is carried out from the axially upper and lower ends of the piston bolt 4 to form a compression-side hole 72 and an extension-side hole 73. In this case, because the work (piston bolt 4) is inverted to drill each hole, misalignment is likely to occur. In this regard, an inner peripheral groove 74 is provided in an approximately central portion of the piston bolt 4 to allow misalignment (a step in the hole) and to accommodate burrs resulting from the drilling process.

Although in the first and second embodiments the extension and compression pressure control valves 21 and 32 are so structured that the valve members 42 and 43 are seated directly on the respective valve seats 37 and 38, it is also possible to perform the valve open-close operation by using flexible disk valves installed on either the valve members 42 and 43 or the valve seats 37 and 38. In addition, the seat portions of the extension and compression pressure control valves 21 and 32 can be improved in sealing properties by coating them with a rubber-based paint, an elastic resin material or the like.

As has been detailed above, according to the damping force control type hydraulic shock absorber of the present invention, the hydraulic fluid chambers at both ends of the slider valve in the sleeve of the damping force control valve, which is a variable pressure control valve, are cut off from the ports provided in the sleeve. Therefore, the pressure of hydraulic fluid in the ports of the sleeve does not act on the hydraulic fluid chambers at the two ends of the slider valve. Accordingly, there is no possibility of the slider valve moving under the influence of the pressure. Thus, stable damping force can be obtained.

It should be noted that the present invention is not necessarily limited to the foregoing embodiments but can be modified in a variety of ways without departing from the gist of the present invention.

What is claimed is:

1. A damping force control type hydraulic shock absorber comprising:
   a cylinder having a hydraulic fluid sealed therein;
   a piston slidably fitted in said cylinder;
   a piston rod connected at one end thereof to said piston, the other end of said piston rod extending to an outside of said cylinder;
   a hydraulic fluid passage for passing the hydraulic fluid in response to sliding movement of said piston;
   a damping force control valve for controlling damping force by controlling flow of the hydraulic fluid through said hydraulic fluid passage; and
   a mechanism for actuating said damping force control valve,
   wherein said damping force control valve is a variable pressure control valve comprising a cylindrical sleeve having an upstream port and a downstream port in the side wall thereof and a slider valve slidably received in the sleeve and including a valve member which controls flow of the hydraulic fluid between said upstream and down stream ports by the movement of said slider valve, said valve member having an upstream end portion and a downstream end portion, and
   wherein a hydraulic fluid chamber formed on the side of said downstream end portion of said valve member is cut off from said downstream port.

2. A damping force control type hydraulic shock absorber according to claim 1, wherein said downstream end portion of said valve member sealingly engages with an inner wall of said cylindrical sleeve so that said hydraulic fluid chamber is cut off from said downstream port.

3. A damping force control type hydraulic shock absorber according to claim 1, further comprising a pilot operated type damping valve disposed in said hydraulic fluid passage on the upstream side of said upstream port of the sleeve and including a disk valve which opens depending on the pressure of the hydraulic fluid applied thereto to thereby generating a damping force and a pilot chamber formed on the downstream side of said disk valve and communicating with said upstream port.

4. A damping force control type hydraulic shock absorber comprising:
   a cylinder having a hydraulic fluid sealed therein;
   a piston slidably fitted in said cylinder;
   a piston rod connected at one end thereof to said piston, the other end of said piston rod extending to an outside of said cylinder;
   a hydraulic fluid passage for passing the hydraulic fluid in response to sliding movement of said piston;
   a damping force control valve for controlling damping force by controlling flow of the hydraulic fluid through said hydraulic fluid passage; and a mechanism for actuating said damping force control valve, wherein said damping force control valve is a variable pressure control valve comprising:

a cylindrical sleeve having extension side upstream and downstream ports and compression side upstream and downstream ports in the side wall of the sleeve a slider valve slidably received in the sleeve and including extension and compression valve members each of which controls flow of the hydraulic fluid between said upstream and downstream ports by the movement of said slider valve, each of said valve members having an upstream end portion and a downstream end portion, and wherein a hydraulic fluid chamber formed on the side of said downstream end portion of each said valve member is cut off from said downstream port.

5. A damping force control type hydraulic shock absorber according to claim 4, wherein said downstream end portions of said valve members sealingly engage with an inner wall of said cylindrical sleeve so that said hydraulic fluid chambers are cut off from said downstream ports.

6. A damping force control type hydraulic shock absorber according to claim 4, wherein said actuating mechanism includes a solenoid device having an actuating rod which engages with one of said valve members and a spring which engages the other of said valve members for biasing the slider valve against said actuating rod.

7. A damping force control type hydraulic shock absorber according to claim 6, wherein said hydraulic fluid chambers on the downstream end portions of said valve members are communicated with each other through a passage formed in said slider valve.

8. A damping force control type hydraulic shock absorber according to claim 6, wherein said valve members have elongated portions extending so as to engage with each other.

9. A damping force control type hydraulic shock absorber according to claim 4, wherein said slider valve includes a cylindrical slider body with said valve members being press fit into said slider body.

10. A damping force control type hydraulic shock absorber according to claim 4, further comprising extension side and compression side pilot operated type damping valves, each damping valve being disposed in said hydraulic fluid passage on the upstream side of the associated upstream port of the sleeve and including a disk valve which opens depending on the pressure of the hydraulic fluid applied thereto to thereby generating a damping force and a pilot chamber formed on the downstream side of said disk valve and communicating with said upstream port.

* * * * *

UNITED STATES PATENT AND TRADEMARK OFFICE
CERTIFICATE OF CORRECTION

PATENT NO. : 6,374,967 B2 Page 1 of 1
DATED : April 23, 2002
INVENTOR(S) : Takuya Matsumoto et al.

It is certified that error appears in the above-identified patent and that said Letters Patent is hereby corrected as shown below:

Title page,
Item [30], please insert the following:
-- [30] Foreign Application Priority Data
      November 30, 1999  (JP) ……….340704/1999 --

Signed and Sealed this

Tenth Day of December, 2002

JAMES E. ROGAN
*Director of the United States Patent and Trademark Office*